United States Patent [19]

Neeper et al.

[11] 4,409,530
[45] Oct. 11, 1983

[54] METHOD AND APPARATUS FOR STEPPER MOTOR POSITION CONTROL

[75] Inventors: Robert K. Neeper, Yorba Linda; Richard C. Meyer, La Habra, both of Calif.

[73] Assignee: Beckman Instruments, Inc., Fullerton, Calif.

[21] Appl. No.: 205,114

[22] Filed: Nov. 10, 1980

[51] Int. Cl.³ .............................................. G05B 19/40
[52] U.S. Cl. ..................................... 318/685; 318/254
[58] Field of Search ................ 318/685, 138, 254, 696

[56] References Cited

U.S. PATENT DOCUMENTS

| | | | |
|---|---|---|---|
| 3,465,217 | 9/1969 | Kress | 318/685 X |
| 3,555,284 | 1/1971 | Anderson | 250/218 |
| 3,575,653 | 4/1971 | Gucwa | 318/685 |
| 3,576,441 | 4/1971 | Adams et al. | 250/218 |
| 3,614,434 | 10/1971 | Horwitz | 250/71.5 |
| 3,778,790 | 12/1973 | Prost et al. | 340/174.1 A |
| 3,861,300 | 1/1975 | Chida et al. | 318/685 X |
| 4,090,791 | 5/1978 | Siddiqu et al. | 356/184 |
| 4,262,240 | 4/1981 | Arai | 318/685 |
| 4,339,699 | 7/1982 | Jonge et al. | 318/640 X |

Primary Examiner—B. Dobeck
Attorney, Agent, or Firm—R. J. Steinmeyer; J. E. Vanderburgh; Timothy R. Schulte

[57] ABSTRACT

A stepper motor positioning control utilizing phase detection of the stepper motor windings. The device utilizes crude positioning apparatus to position the attached turntable or the like in an approximate position. The phase detection of the stepper motor windings is then used to position the attached turntable in the exact location desired.

2 Claims, 2 Drawing Figures

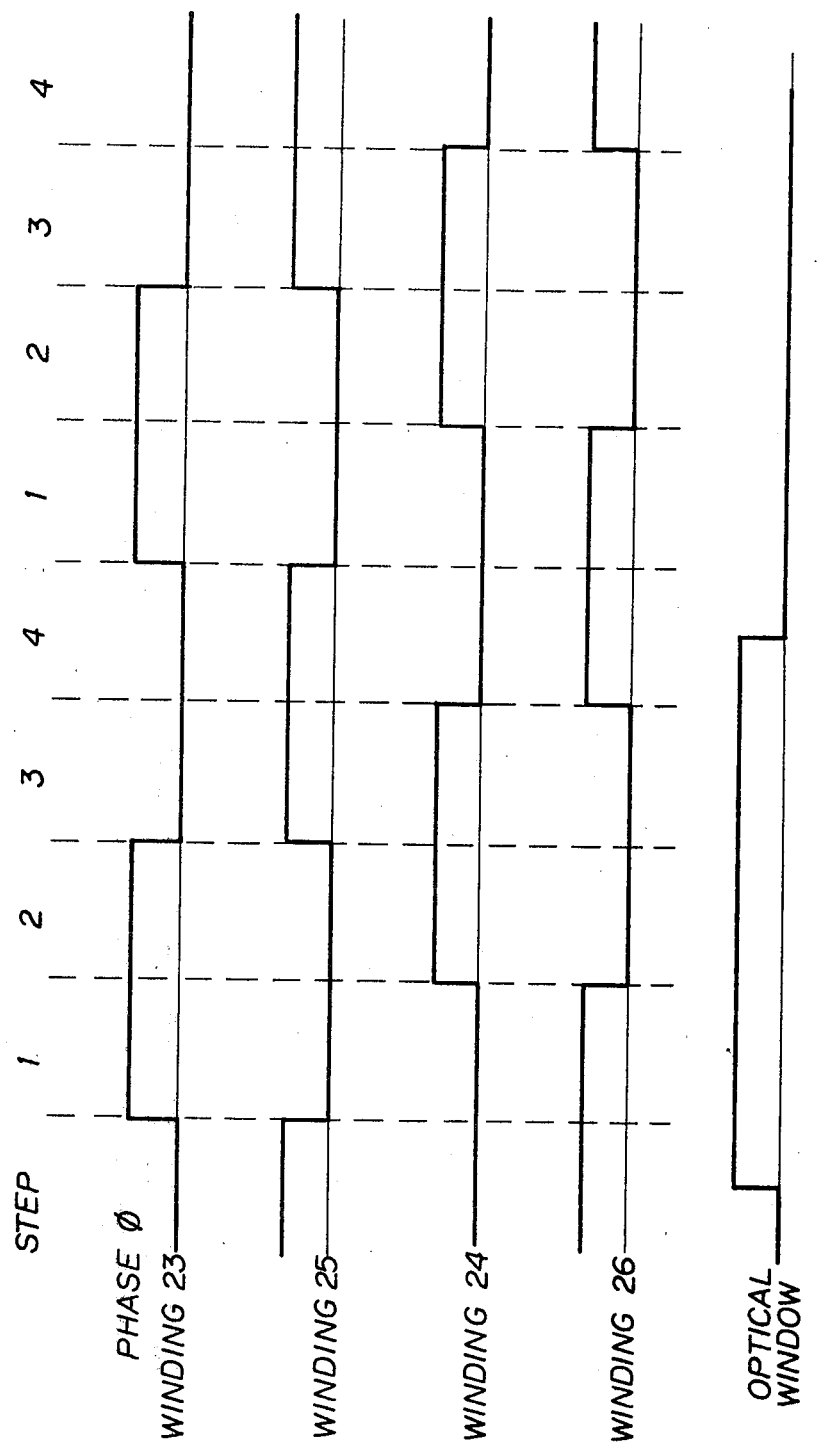

METHOD AND APPARATUS FOR STEPPER MOTOR POSITION CONTROL

BACKGROUND OF THE INVENTION

1. Field of the Invention

This invention pertains to the field of stepper motor position control. More particularly, the invention is a method and apparatus for controlling the power to a stepper motor based on stepper motor position information feedback. By way of further characterization, but not by way of limitation thereto, the invention is a method and apparatus which combines position information feedback with phase detection of the stepper motor windings to ensure precise stepper motor positioning.

2. Description of the Prior Art

In diagnostic instrumentation and other devices precise positioning of one element with respect to another is often required. For example, in some instruments a turntable containing numerous receptacles must be positioned at a precise point at allow access by probes or other devices in order that testing or other operations may be performed on the receptacle contents. The positioning accuracy required in such devices has been difficult to achieve.

Prior devices have employed servo systems including a DC motor drive with an optical sensor to detect the exact center of each receptacle. While suited for their intended purpose, these DC or other motor systems do not have the positioning accuracy or repeatability of a stepper motor system. However, while stepper motor systems are preferably from an engineering standpoint, their cost, when combined with the cost of optical feedback sensors, is greater than that for the servo systems. The required optical feedback sensors for stepper motors are expensive because the width of the mark on the turntable must be very precise and the optical detector must be very sensitive to give the required resolution.

A simpler and economically feasible solution would be to employ wider marks on the turntable and use less sensitive detectors. However, with this arrangement, the optical sensor may not "see" the mark at precisely the same position each time thus decreasing accuracy. In order to utilize this economically feasible arrangement an additional element is required to precisely position the stepper motor.

SUMMARY OF THE INVENTION

The invention is a method and apparatus for precisely controlling the position of a stepper motor. In the preferred embodiment, a position sensing means is used to ensure that a turntable connected to the stepper motor is in the approximate position desired. An energizing means is connected to the stepper motor windings and is controlled by signals from the position sensing means. A phase detecting means is connected to the stepper motor to determine the phase relationship of the stepper motor windings. This phase detecting means is also connected to the energizing means such that the energizing means is activated until the phase detecting means has sensed a predetermined phase relationship of the stepper motor windings.

The positioning means includes an encoding disc and an optical sensor to position the turntable in the approximate position desired. The energizing means includes a drive circuit which receives a signal from a pulse generator through an AND gate. The phase detecting means includes a comparator which signals the driving means when the desired phase relationship is detected. That is, once the turntable is in the approximate position desired, the phase detecting means is used as a fine-tuning mechanism to precisely position the turntable.

The precise angular position of the stepper motor can be determined by detecting the phase relationship of the energized windings in the stepper motor. The stepper motor may thus be stopped at the precise step desired without utilizing expensive optical detecting apparatus. The number of windings in the stepper motor and drive means determines the number of combinations of phases which can be monitored.

BRIEF DESCRIPTION OF THE DRAWINGS

FIG. 2 illustrates the energization wavetrains supplied to the stepper motor windings within the optical window.

DESCRIPTION OF THE PREFERRED EMBODIMENT

Figure 1:
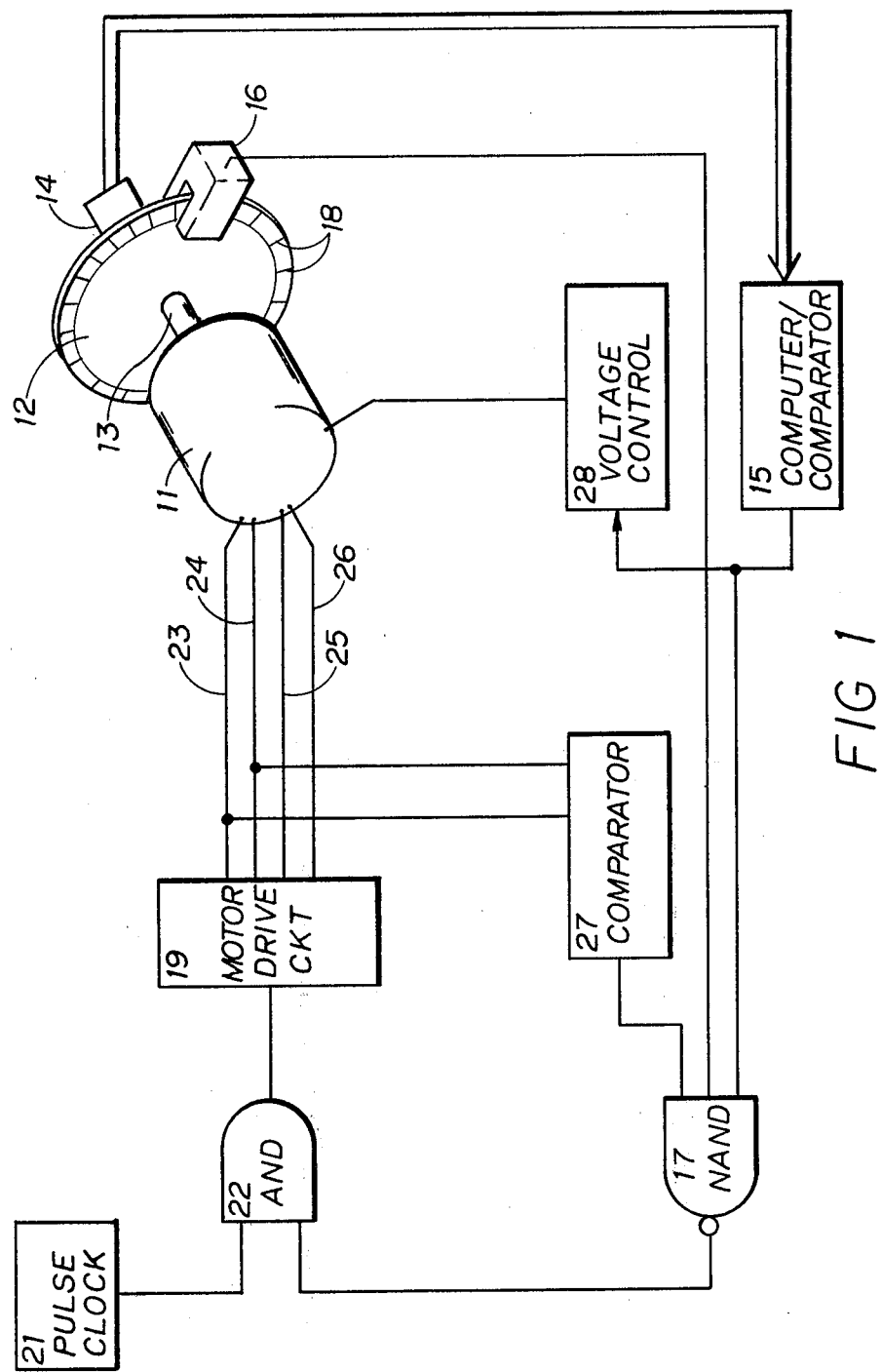
FIG. 1 is a block diagram of the position control circuitry.

Referring to FIG. 1, a stepper motor 11 is coupled with a turntable 12 by a shaft 13. A position sensing means which may include a conventional position encoder 14 is connected to a computer/comparator 15. Computer/comparator 15 and an optical sensor 16, are connected to a NAND gate 17. A plurality of optical marks 18 are located on turntable 12. An energizing means may include a motor drive circuit 19 which receives signals from a pulse clock 21 through an AND gate 22. Motor drive circuit 19 is connected to stepper motor 11 by conductors 23, 24, 25, and 26. The number of conductors corresponds to the number of windings in stepper motor 11. Each of conductors 23, 24, 25, and 26 is connected to a corresponding winding in stepper motor 11.

A phase detecting means may include a comparator 27. Comparator 27 is connected to at least two of conductors 23, 24, 25, or 26. In the preferred embodiment, in which stepper motor 11 is operated in a full-step mode, comparator 27, connected to conductors 23 and 24, can detect four phase combinations. This allows positioning within the desired parameters. Comparator 27 is also connected to NAND gate 17. NAND gate 17 is connected to AND gate 22. A voltage control circuit 28 is connected to computer/comparator 15 and to stepper motor 11.

Referring to FIG. 2, an energization sequence for conductors 23, 24, 25 and 26 is illustrated. The energization sequence is shown along with an "optical window" which is determined by system parameters.

MODE OF OPERATION

Referring to FIG. 1, stepper motor 11 is driven by motor drive circuit 19 which generates pulses on conductors 23, 24, 25, and 26 to the stepper motor windings which cause stepper motor 11 to rotate. Pulse clock 21 supplies pulses which will make stepper motor 11 advance one step per pulse if AND gate 22 is enabled. AND gate 22 is enabled by high signals from both pulse clock 21 and NAND gate 17.

NAND gate 17 will generate a high state when any of the three inputs to NAND gate 17 is low. That is, high inputs from each of comparator 27, optical sensor 16, and computer/comparator 15 indicate that turntable 12 is in the exact position desired and will cause NAND gate 17 to generate a low state to AND gate 22. AND gate 22 will thus generate a low state thereby disabling stepper motor 11. Should any one of comparator 27, optical sensor 16, or position encoder 14 generate a low state then NAND gate 17 will generate a high state to AND gate 22 thus causing stepper motor 11 to rotate turntable 12.

In diagnostic instrumentation a plurality of cups or receptacles are located on turntable 12. These cups are rotated to a location where a sample or other substance could be injected into a cup and a measurement taken. Position encoder 14 is used to identify a particular cup from among these plurality of cups. A high state will be generated by position encoder 14 until turntable 12 has rotated to the desired cup.

Once the desired cup has been identified by position encoder 14, optical sensor 16 senses optical markings 18 which correspond to the aproximate center of the cup. The desired cup or receptacle is thus approximately centered at the desired location. However, it is important that the cup be exactly centered such that sample or other substances may be injected, mixed, or otherwise operated upon.

In order to center the cup in the precise location the phase detecting means is employed. The phase detecting means includes comparator 27 which senses the energization level of conductors 23, 24, 25, and/or 26 and thereby determines when a particular phase relationship between the windings on stepper motor 11 is met. Comparator 27 sends a high signal to NAND gate 17 when the predetermined phase relationship is met. The width of optical markings 18 determines the deviation from cup center and this width is defined in terms of a multiple of steps of stepper motor 11. The optical marking width thus defines the "optical window" illustrated in FIG. 2. Once position encoder 14 and optical sensor 16 have sensed the desired optical marking 18 then comparator 27 determines at what step within that marking stepper motor 11 should stop. Stepper motor 11 may thus be stopped at the exact step which centers the cup or receptacle in the desired location.

Once a cup is centered in the desired position all inputs to NAND gate 17 are low thereby maintaining the predetermined phase relationship sensed by comparator 27. The cup remains centered. When it is desired to move to a different cup, the signal from computer/comparator 15 is altered to a low state thus again enabling AND gate 22 and allowing stepper motor 11 to be driven by pulse clock 21 and drive circuit 19. When the desired cup is reached the signal from encoder 14 is high and a high signal is sent to NAND gate 17.

Referring to FIG. 2, the energization scheme of conductors 23, 24, 25, and 26 is shown. That is, stepper motor 11 is driven by wavetrains generated by motor drive circuit 19. As shown in FIG. 2, these wavetrains are ninety degrees out of phase such that the phasing sequence repeats every four steps. This is a standard method for driving stepper motors. There is a specific phase combination corresponding to each step of stepper motor 11 within the defined "optical window." For example, if windings 23 and 24 are both high then stepper motor 11 will always be at step 2. If step 2 was desired comparator 27 would look for a low state on winding 23 and a high state on winding 24. The predetermined phase relationship corresponding to step 2 is utilized in the preferred embodiment. However, any suitable phase relationship may be employed.

Referring again to FIG. 2, the "optical window" should not be too wide such that the predetermined phase relationship will not occur more than once within the "optical window." If the "optical window" is too narrow then the optical detecting system must be more precise and is therefore more expensive as discussed above. An "optical window" of four steps is used in the preferred embodiment. This corresponds to the number of phase combinations possible with the apparatus shown in FIG. 1. The "optical window" will thus vary somewhat depending on system design parameters but it will preferably approximate the number of phase combinations capable of being sensed.

The turntable is initially calibrated by manually positioning the preferred phase to the center of the optical window thereby centering a cup. The step at which stepper motor 11 is stopped is then the specific step which will center all succeeding cups. If the specific step within a known sequence of steps can be identified, then the optical sensor required to define the "optical window" need only be accurate to within that known number of steps. This is illustrated in FIG. 2 where the "optical window" is four steps wide. Once the turntable is positioned such that the optical detector identifies the target cup as positioned within the "optical window", the phase detecting apparatus can be utilized to position the cup at exactly the step which will center it at the desired location for probe access.

The predetermined phase relationship is determined by the parameters of stepper motor 11. That is, in the present invention a four winding stepping motor is used and two windings are monitored which allows four possible phase combinations. The angular position of stepper motor 11 can be determined by detecting a particular phase combination, i.e., which two of these windings are energized at any given time. It will be appreciated, however, that the invention may be advantageously employed with stepping motors having other than four windings or with different phase combinations. The number of phase relationship combinations would change depending upon how many windings are monitored.

With a four winding stepping motor, only two windings need to be monitored if it is desired to operate the motor in a full-step motor. In a full-step mode the resulting increase in position resolution is four times greater than if optical sensor 16 were used along. By determining which of the windings in stepper motor 11 are energized the exact position of stepper motor 11 is known. That is, two of the windings are always energized while two are not. If stepper motor 11 is operated in a half-step mode, then all four phases, that is, all four windings, must be monitored but the resolution increase over a sensor alone is increased eight to one. The stepper motor employed with the preferred embodiment is a two hundred step per revolution, four-phase, stepper motor which is geared to the turntable at a 4 to 1 ratio.

The present invention also includes a voltage control circuit 28, which reduces the power to stepper motor 11 to allow manual positioning of the turntable 12 with minimum resistance thereby facilitating calibration. To return to automatic operation computer/comparator 15 removes the low signal from NAND gate 17 until the new position is reached.

Particular forms of the invention have been described with respect to a particular embodiment thereof; however, it is not to be so limited as changes and modifications may be made therein which are within the full intended scope of the invention as defined by the appended claims. For example, the invention could have applications in linear stepping motor position control. That is, in any situation where it is important to know that the stepping motor actually did step the required number of steps, the invention would provide position information using the least expensive sensors. It is thus applicable to systems such as linear X-Y system plotters, printers and the like or for industrial machining of parts. Use of the invention also allows a reduction in the power which is supplied to the motor. That is, in systems where the operation duty cycle is low, it can be desirable to over drive the motor. This would overheat the motor if it were not possible to lower the power when the system is static. Whenever the predetermined phase is sensed, it is permissible to lower or remove power.

The foregoing description, taken together with the appended claims, constitutes a disclosure which enables one skilled in the art and having the benefit of the teachings contained therein to make and use the invention. Further, the structure herein described constitutes a meritorious advance in the art which is unobvious to such skilled workers not having the benefit of these teachings.

What is claimed is:

1. Apparatus for positioning a turntable comprising:
    a four winding stepping motor coupled with said turntable;
    means, connected to said four windings, for energizing said four windings;
    a NAND gate connected to said energizing means;
    an optical sensor, associated with said turntable and connected to said NAND gate;
    a position encoder, associated with said turntable and connected to said NAND gate; and
    a comparator, connected to at least two of said windings and to said NAND gate.

2. Apparatus according to claim 1 further including a voltage control circuit connected to said stepping motor and said position encoder.

* * * * *